United States Patent
Bloch et al.

(10) Patent No.: US 12,437,420 B2
(45) Date of Patent: Oct. 7, 2025

(54) INITIAL ORBIT DETERMINATION USING ANGULAR VELOCITY AND ANGULAR ACCELERATION MEASUREMENTS

(71) Applicant: Applied Research Associates, Inc., Albuquerque, NM (US)

(72) Inventors: Jeffrey J. Bloch, Santa Fe, NM (US); David E. Briscoe, Albuquerque, NM (US)

(73) Assignee: Applied Research Associates, Inc., Albuquerque, NM (US)

( * ) Notice: Subject to any disclaimer, the term of this patent is extended or adjusted under 35 U.S.C. 154(b) by 0 days.

(21) Appl. No.: 18/797,005

(22) Filed: Aug. 7, 2024

(65) Prior Publication Data

US 2024/0394895 A1 Nov. 28, 2024

Related U.S. Application Data

(63) Continuation of application No. 18/350,039, filed on Jul. 11, 2023, now Pat. No. 12,080,000.

(60) Provisional application No. 63/389,538, filed on Jul. 15, 2022.

(51) Int. Cl.
*G06T 7/20* (2017.01)

(52) U.S. Cl.
CPC ...... *G06T 7/20* (2013.01); *G06T 2207/10032* (2013.01)

(58) Field of Classification Search
CPC ... G06T 7/20; G06T 7/70; G06T 2207/10032; G06T 2207/30241
See application file for complete search history.

(56) References Cited

PUBLICATIONS

European Patent Application 23751157.1 Invitation to Respond to Objections in the International Phase issued Feb. 25, 2025.

*Primary Examiner* — Sam Bhattacharya
(74) *Attorney, Agent, or Firm* — Erise IP, P.A.

(57) ABSTRACT

The current disclosure provides systems and methods of directly measuring angular velocity and angular acceleration of space objects and using the measured angular velocity and angular acceleration as inputs into new and unique algorithms for initial orbit determination. Sensors measuring locations and times of light events may be used to generate a virtual rate track image for identification of space objects. Right ascension and declination of the space object events versus time may be fit to polynomials or splines to determine associated angle, angular rate, and angular acceleration of the space objects. New and unique initial orbit algorithms may then be applied to estimate orbital elements of the space objects.

20 Claims, 12 Drawing Sheets

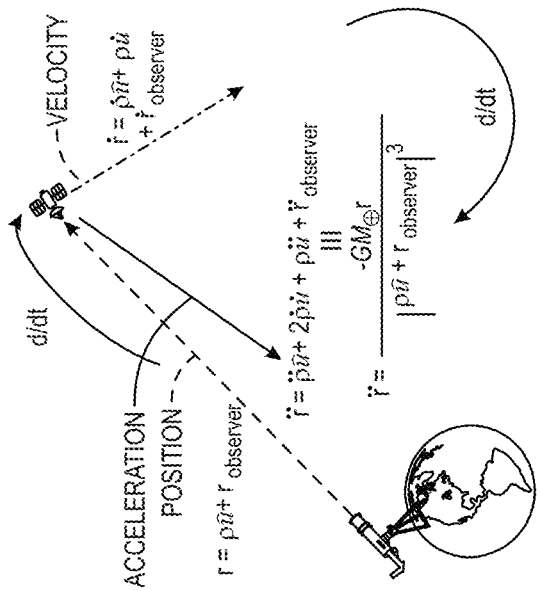

INITIAL ORBIT DETERMINATION MATH: LAPLACE

NUMERICALLY SOLVE FOR RANGE TO SATELLITE ($\rho$):

$$\rho(\hat{u} \times \dot{\hat{u}}) \cdot \ddot{\hat{u}} - (\hat{u} \times \dot{\hat{u}}) \cdot \left( \frac{-GM_\oplus(\rho\hat{u} + r_{observer})}{|\rho\hat{u} + r_{observer}|^3} - \ddot{r}_{observer} \right) = 0$$

SOLVE FOR RANGE TO SATELLITE ($\dot{\rho}$):

$$\dot{\rho} = \frac{\dot{\hat{u}} \cdot \left( \frac{-GM_\oplus(\rho\hat{u} + r_{observer})}{|\rho\hat{u} + r_{observer}|^3} - \dot{r}_{observer} \right) - \rho(\hat{u} \cdot \ddot{\hat{u}})}{2|\dot{\hat{u}}|^2}$$

$r$ = TARGET POSITION AT TIME t WITH RESPECT TO EARTH CENTER
$\hat{u}$ = OBSERVATION VECTOR FROM OBSERVER OF TARGET AT TIME t
$\dot{\hat{u}}$ = ANGULAR VELOCITY VECTOR OF TARGET AS SEEN BY OBSERVER AT TIME t
$\ddot{\hat{u}}$ = ANGULAR ACCELERATION VECTOR OF TARGET AS SEEN BY OBSERVER AT TIME t
$r_{observer}$ = POSITION OF OBSERVER AT TIME t
$\dot{r}_{observer}$ = VELOCITY OF OBSERVER AT TIME t
$\ddot{r}_{observer}$ = ACCELERATION OF OBSERVER AT TIME t
$\rho$ = RANGE TO SATELLITE FROM OBSERVER AT TIME t
$\dot{\rho}$ = RANGE RATE TO SATELLITE FROM OBSERVER AT TIME t
$\ddot{\rho}$ = RANGE ACCELERATION TO SATELLITE FROM OBSERVER AT TIME t
$GM_\oplus$ = GRAVITATIONAL CONSTANT
$r, \dot{r}_\oplus$ = TARGET STATE VECTOR AT TIME t
$\ddot{r}$ = TARGET ACCELERATION VECTOR AT TIME t

FIG. 2A $$\ddot{\vec{R}} = \ddot{\vec{r}}_t - \ddot{\vec{r}}_o$$
$$= \frac{-GM_\oplus \vec{r}_t}{|\vec{r}_t|^3} - \frac{-GM_\oplus \vec{r}_o}{|\vec{r}_o|^3}$$
$$= \frac{-GM_\oplus [\vec{r}_o + \rho \vec{u}]}{|\vec{r}_o + \rho \vec{u}|^3} - \frac{-GM_\oplus \vec{r}_o}{|\vec{r}_o|^3}$$
$$= \vec{A}(\rho)$$

$\rho, \dot{\rho}$ = UNKNOWN RANGE AND RANGE RATE TO OBJECT

SOLVE ONE NON-LINEAR EQUATION IN $\rho$:
$\rho \, (\vec{u} \times \dot{\vec{u}}) \cdot \vec{u} - (\vec{u} \times \vec{u}) \cdot \vec{A}(\rho) = 0$
THEN PLUG IN $\rho$ TO SOLVE FOR $\dot{\rho}$:

$$\dot{\rho} = \left[ \frac{\vec{u} \cdot \vec{A}(\rho) - \rho(\dot{\vec{u}} \cdot \dot{\vec{u}})}{2(\vec{u} \cdot \dot{\vec{u}})} \right]$$

$\vec{r}_t = \vec{r}_o + \rho \vec{u}$
$\dot{\vec{r}}_t = \dot{\vec{r}}_o + \dot{\rho} \vec{u} + \rho \dot{\vec{u}}$
$\vec{R} = \rho \vec{u}$

UNKNOWN OBJECT

OBSERVER $\vec{r}$ = TARGET POSITION AT TIME t WITH RESPECT TO EARTH CENTER
$\vec{u}$ = OBSERVATION VECTOR FROM OBSERVER OF TARGET AT TIME t
$\dot{\vec{u}}$ = ANGULAR VELOCITY VECTOR OF TARGET AS SEEN BY OBSERVER AT TIME t
$\ddot{\vec{u}}$ = ANGULAR ACCELERATION VECTOR OF TARGET AS SEEN BY OBSERVER AT TIME t
$\vec{r}$ OBSERVER = POSITION OF OBSERVER AT TIME t
$\dot{\vec{r}}$ OBSERVER = VELOCITY OF OBSERVER AT TIME t
$\ddot{\vec{r}}$ OBSERVER = ACCELERATION OF OBSERVER AT TIME t
$\rho$ = RANGE TO SATELLITE FROM OBSERVER AT TIME t
$\dot{\rho}$ = RANGE RATE TO SATELLITE FROM OBSERVER AT TIME t
$\ddot{\rho}$ = RANGE ACCELERATION TO SATELLITE FROM OBSERVER AT TIME t
$GM_\oplus$ = GRAVITATIONAL CONSTANT
$\vec{r}, \dot{\vec{r}}_\oplus$ = TARGET STATE VECTOR AT TIME t
$\ddot{\vec{r}}$ = TARGET ACCELERATION VECTOR AT TIME t

FIG. 2B

INITIAL ORBIT DETERMINATION USING ANGULAR VELOCITY AND ANGULAR ACCELERATION MEASUREMENTS

RELATED APPLICATIONS

This patent application is a continuation application claiming priority benefit, with regard to all common subject matter, of U.S. patent application Ser. No. 18/350,039 filed Jul. 11, 2023, and entitled "INITIAL ORBIT DETERMINATION USING ANGULAR VELOCITY AND ANGULAR ACCELERATION MEASUREMENTS" ("the '039 Application"). The '039 Application is a non-provisional patent application claiming priority benefit, with regard to all common subject matter, of U.S. Provisional Patent Application No. 63/389,538 filed Jul. 15, 2022, and entitled "INITIAL ORBIT DETERMINATION USING ANGULAR VELOCITY AND ANGULAR ACCELERATION MEASUREMENTS." The identified earlier-filed patent applications are hereby incorporated by reference in their entirety into the present application.

BACKGROUND

1. Field

Embodiments of the disclosure relate to initial orbit determination (IOD). More specifically, embodiments of the disclosure relate to IOD using measured angular rate and measured angular acceleration as inputs.

2. Related Art

Typically, standard orbits require six parameters to be described: eccentricity, semimajor axis, inclination, longitude of the ascending node, argument of periapsis, and true anomaly. These parameters may be determined by taking measurements of orbiting bodies over time and utilizing orbit determination algorithms to estimate the orbits. Standard methods involve a plurality of sensors for measuring position at various times, calculating physical model trajectories, projecting potential orbits, and converging on an estimated orbit. These typical methods generally take a relatively long time (e.g., minutes or hours) to obtain an initial estimate of the orbit of the object.

Traditionally, various IOD approaches have been performed with relatively similar results. One class of traditional IOD techniques is to collect a plurality of observations over relatively long periods (e.g., the method of Gooding). Trial orbital path generations may be integrated over time to compare to observed data. The trial orbits are iterated upon until the mid-point observation matches the measured azimuth and elevation for the time of collection for the middle observation. When the observation and trial orbit align, an accurate initial orbit is determined. However, any change in orbital parameters of the satellite during the collection period will result in inaccurate results.

A second exemplary IOD calculation method typically called the Laplace method uses three discrete observations to numerically estimate angular velocity and angular acceleration at the mid-point observation. A problem associated with this method is that the angular velocity and angular acceleration of both the observer and target can change dramatically between observations. If the time between the successive observations is too short, errors in angular measurement will lead to inaccurate numerical derivatives of the angular velocity and angular acceleration. If the time between the successive observations is too long, the angular velocity and angular acceleration of the observer and target object may change too much for an accurate estimate to be made for the middle observation point. The objects motion may also have a significant third derivative (change in angular acceleration), which makes the numerical estimate inaccurate.

Currently, more and more satellites and more and more space junk are being placed into orbit. This creates clutter for satellites. This clutter must be tracked to avoid potential impacts. When satellites are moved by commanded or uncommanded forces new orbit updates must be performed. The longer it takes to determine the new orbit, the more likely it is that an impact will take place. Therefore, it is necessary to develop new techniques for IOD that are quick and accurate.

There are currently plans to send more satellites into lunar orbits. These lunar/earth orbits can be unconventional and can be changed by commanded and uncommanded forces (e.g., relatively strong solar radiation pressure). It is necessary to accurately track these orbit changes to take corrective measures.

What is needed are systems and methods of quickly and accurately performing IOD.

SUMMARY

Embodiments of the invention solve the above-mentioned problems by providing systems and methods of directly measuring angular velocity and angular acceleration and using the measured angular velocity and angular acceleration as inputs into new and unique algorithms for IOD.

A first embodiment is directed to a method of determining an orbit of an object. The method comprises obtaining, by a sensor, data indicative of a plurality of objects in orbits, wherein the data is indicative of angular velocity and angular acceleration of the object of the plurality of objects, identifying the object from the data, measuring the angular velocity and the angular acceleration from the data, determining an initial orbit of the object using the angular velocity and the angular acceleration, and estimating orbital elements from the initial orbit of the object.

A second embodiment is directed to one or more non-transitory computer-readable media storing computer-executable instructions that, when executed by at least one processor, performs a method of determining an orbit of an object. The method comprises obtaining, by a sensor, data indicative of a plurality of objects in orbits, wherein the data is indicative of angular velocity and angular acceleration of the object of the plurality of objects, identifying the object from the data by generating a virtual rate track image comprising virtual rate tracks of each object of the plurality of objects in the virtual rate track image, mapping the virtual rate tracks to locations in a field of view, identifying the plurality of objects based on the locations in the field of view, and identifying the object from the plurality of objects based on a comparison of the virtual rate tracks, and determining the angular velocity and the angular acceleration of the object from the virtual rate tracks, determining an initial orbit of the object using the angular velocity and the angular acceleration, and estimating orbital elements from the initial orbit of the object.

A third embodiment is directed to one or more non-transitory computer-readable media storing computer-executable instructions that, when executed by at least one processor, performs a method of determining an orbit of an object. The method comprises obtaining, by a sensor, data indicative of a plurality of objects in orbits, wherein the data is indicative of angular velocity and angular acceleration of the object of the plurality of objects, identifying the object from the data, measuring the angular velocity and the angular acceleration from the data, determining an initial orbit of the object by fitting an orbit ephemeris to the data, and determining the orbit of the object using the initial orbit as a starting seed solution for an orbit determination algorithm.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIGS. 2A and 2B depict exemplary embodiments of determining an initial state vector using angular velocity and angular acceleration;

Figure 1:
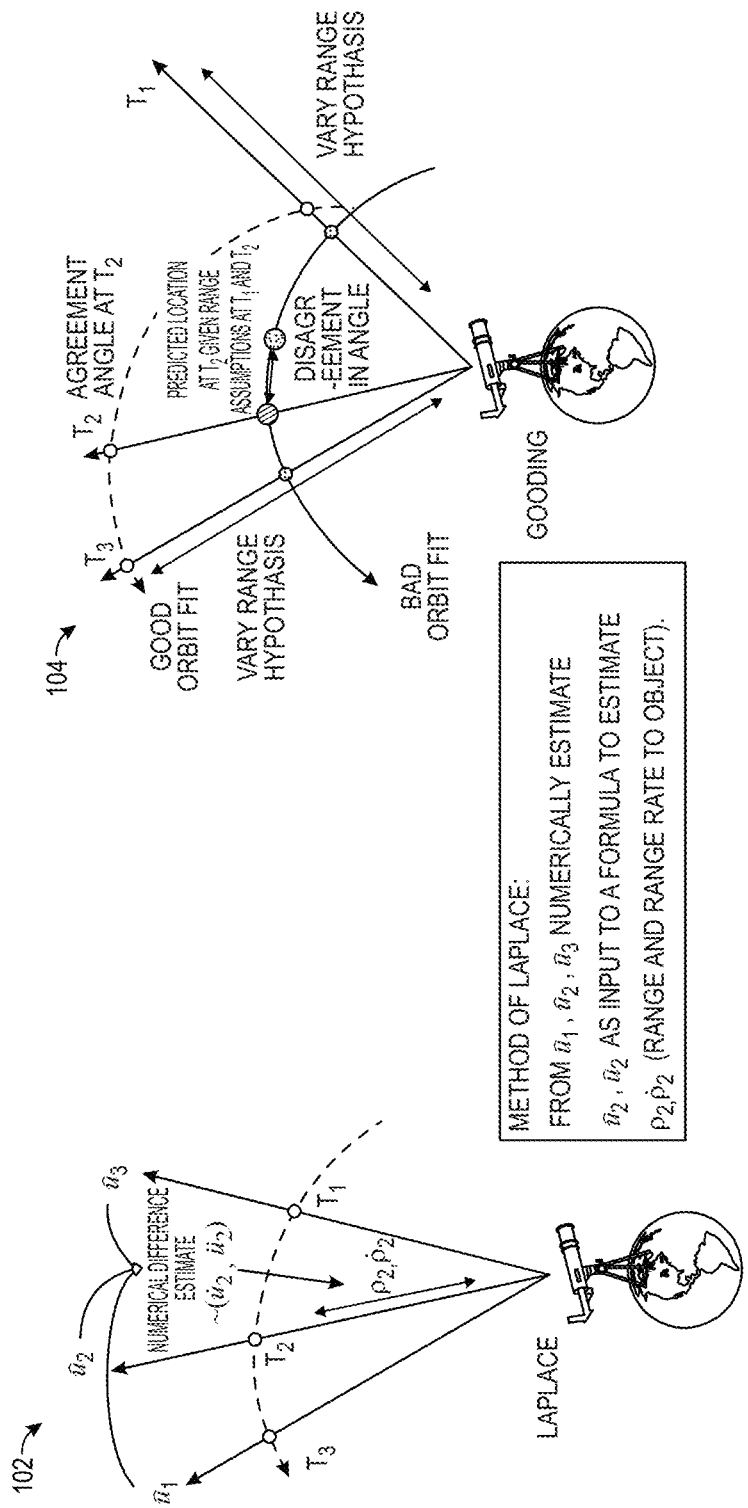
FIG. 1 depicts exemplary prior art methods of IOD.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, embodiments of the current disclosure are directed to systems and methods for quickly and accurately performing initial orbit determination (IOD). In some embodiments, sensors are used for measuring angular velocity and angular acceleration and the angular velocity and the angular acceleration are used as inputs into new and unique orbit determination algorithms. Optical sensors may be used to take a single optical measurement of the sky comprising the object. Utilizing the optical sensors along with new techniques for object detection and orbit determination allows for the transformation of object track data comprising time-tagged pixel illumination and/or photon position data into angular position, angular velocity, and angular acceleration data that may be used to generate an initial object state vector. The systems and methods described herein may quickly and accurately provide an initial orbit solution as a seed for estimating the orbit of new and maneuvered space objects.

Generally, orbits are described in terms of six parameters (i.e., eccentricity, semimajor axis, inclination, longitude of the ascending node, argument of periapsis, and true anomaly). Typically, two angles are measured. In order to describe an orbit these six parameters must be known. Therefore, the object must be tracked to obtain enough information to calculate these parameters. Tracking to obtain enough information to accurately estimate the orbit of the space objects can take minutes or hours. The only requirements are that the motion of the observer and that the gravitational potential along the line of sight be known.

Typically, angular rate and angular acceleration are calculated from the fixed angle measurements. Therefore, the angular velocity and angular acceleration are coupled to the position measurements. Consequently, errors in the position measurements are extended to the angular velocity and angular acceleration calculations. Furthermore, these parameters are coupled in the covariance matrix of current orbit determination methods causing error minimization and noise reduction to be further complicated. Utilizing the sensors described herein, the angular velocity and angular acceleration can be directly measured decoupling angular velocity and angular acceleration from the position measurements of the space objects. Using the angular velocity and the angular acceleration derived directly from measurements as inputs into initial orbit determination algorithms allows the orbit of the space object to be more quickly and accurately determined than typical standard methods.

In some embodiments, the space objects may be any object in orbit about any other object (e.g., planets, stars, satellites, missiles, space junk, and unknown objects). Furthermore, the measurement may be taken from the observer, which may be positioned on the earth or any other object in orbit. In this way, the orbit of any object may be determined from any other object. Accordingly, it may be determined if any two or more orbits intersect. Furthermore, it may be quickly and accurately determined where an orbit may intersect with a location on earth or any other planet or satellite. Any circular, elliptical, parabolic, or hyperbolic orbit may be quickly and accurately be estimated. Similarly, any irregular orbit or unknown trajectory about any celestial body including the moon or comprising the two-body problem, three-body problem, or more, may be estimated. Furthermore, any standard altitude orbit (i.e., Low Earth Orbit (LEO), Medium Earth Orbit (MEO), High Elliptical Orbit (HEO), Geosynchronous Earth Orbit (GEO)) may be estimated using the systems and methods described herein.

In some embodiments, unconventional orbits may be estimated using the systems and methods described herein. There are currently new efforts to expand orbits out to the moon and to other planets. This results in unconventional orbits that do not adhere to the two-body convention. This raises new uncertainty for space objects. The methods and systems described herein can also estimate these unconventional orbits (e.g., lunar orbits, L2 region, earth-moon orbits, orbit transitions, near rectilinear halo).

Generally, orbits may be determined using orbit estimation algorithms from measured data. Typically, state vectors are determined using parameters illustrated in FIG. 1. For example, traditional methods of IOD are shown in FIG. 1. FIG. 1 depicts an exemplary estimation of range ($\rho$) and range rate ($\dot{\rho}$) known as the Laplace method 102. As shown, angular velocity ($\dot{u}_2$) and angular acceleration ($\ddot{u}_2$) cannot be known and must be numerically estimated from the observed position vectors ($\hat{u}_1$, $\hat{u}_2$, and $\hat{u}_3$) position information at times ($T_1$, $T_2$, and $T_3$). If the observations are too close, errors in observation angles produce too much error in the numerical angular derivative motion estimates. If the observations are too far apart, the true angular velocity and the true angular acceleration changes too much between the three measurements for the numerical derivative estimates to be accurate at the mid-time observation.

The Laplace method 102 has its drawbacks. It is currently the least accepted method of IOD. The angular derivatives, angular velocity ($\dot{u}_2$) and angular acceleration ($\ddot{u}_2$), must be numerically estimated from the observed position vectors ($\hat{u}_1$, $\hat{u}_2$, and $\hat{u}_3$). Therefore, the angular velocity and the angular acceleration must be derived from interpolations of fixed angle measurements. Because the angular velocity and angular acceleration values must be derived from fixed angle measurements, the angular velocity and angular acceleration will always be coupled to the fixed angle measurements. This couples any error in measurements, enhances error in measurements, and makes minimizing noise difficult.

The more accepted method is the method of Gooding 104. The method of Gooding 104 comprises collecting a plurality of observations over relatively long periods. Trial orbital path generations may be integrated over time to compare to observed data. The trial orbits are iterated upon until the mid-point observation matches the measured azimuth and elevation for the time of collection for the middle observation. When the observation and trial orbit align, an accurate initial orbit is determined. However, any change in orbital parameters of the satellite during the collection period will result in inaccurate results.

The application of new sensors can allow angular velocity and angular acceleration to be measured rather than calculated. Measuring the angular velocity and angular acceleration decouples the angular velocity and the angular acceleration from the position measurements. These independent measurements add in two terms that previously had to be calculated through successive measurements of fixed angles. Because angle, angular velocity, and angular acceleration can be measured simultaneously, the time to converge on an estimated initial state vector and, thus, an estimated orbit is reduced relative to prior methods. FIGS. 2A and 2B depict exemplary embodiments of using fitted angle, angular rate, and angular acceleration values to find an initial state vector.

FIG. 2A and FIG. 2B depict embodiments of the free-body diagram and calculations required in typical methods to determine range and range rate from measured angular velocity and angular acceleration from an earth-based observer (FIG. 2A) and a space-based observer (FIG. 2B). Here, in embodiments described herein, angular velocity and angular acceleration do not need to be numerically estimated. This reduces computation leaving a single non-linear equation for calculating range and range rate as shown below and derived in FIG. 2B.

$$\rho(\hat{u} \times \dot{u}) \cdot \ddot{u} - (\hat{u} \times \dot{u}) \cdot \vec{A}(\rho) = 0$$

$$\dot{\rho} = \left( \frac{\dot{u} \cdot \vec{A}(\rho) - \rho(\dot{u} \cdot \ddot{u})}{2(\dot{u} \cdot \dot{u})} \right)$$

Therefore, the initial target state vector for the orbiting object can be determined. Similarly, any method of IOD may be adapted to include inputs of the measured angular velocity and angular acceleration and parameters determined therefrom (e.g., range and range rate). Using these measured values decouples angular acceleration and angular velocity from the position measurements in the initial state vector. The initial state vector may then be used as input into orbit determination algorithms such as a Kalman filter (KF), extended Kalman filter (EKF), Batch filters and the like, as described in embodiments below. Using the measured angular rates in calculation of the initial state vector as a starting point for the exemplary EKF amplifies the EKF to converge on a solution much more quickly; in some embodiments, an order of magnitude faster than traditional methods.

Figure 3:
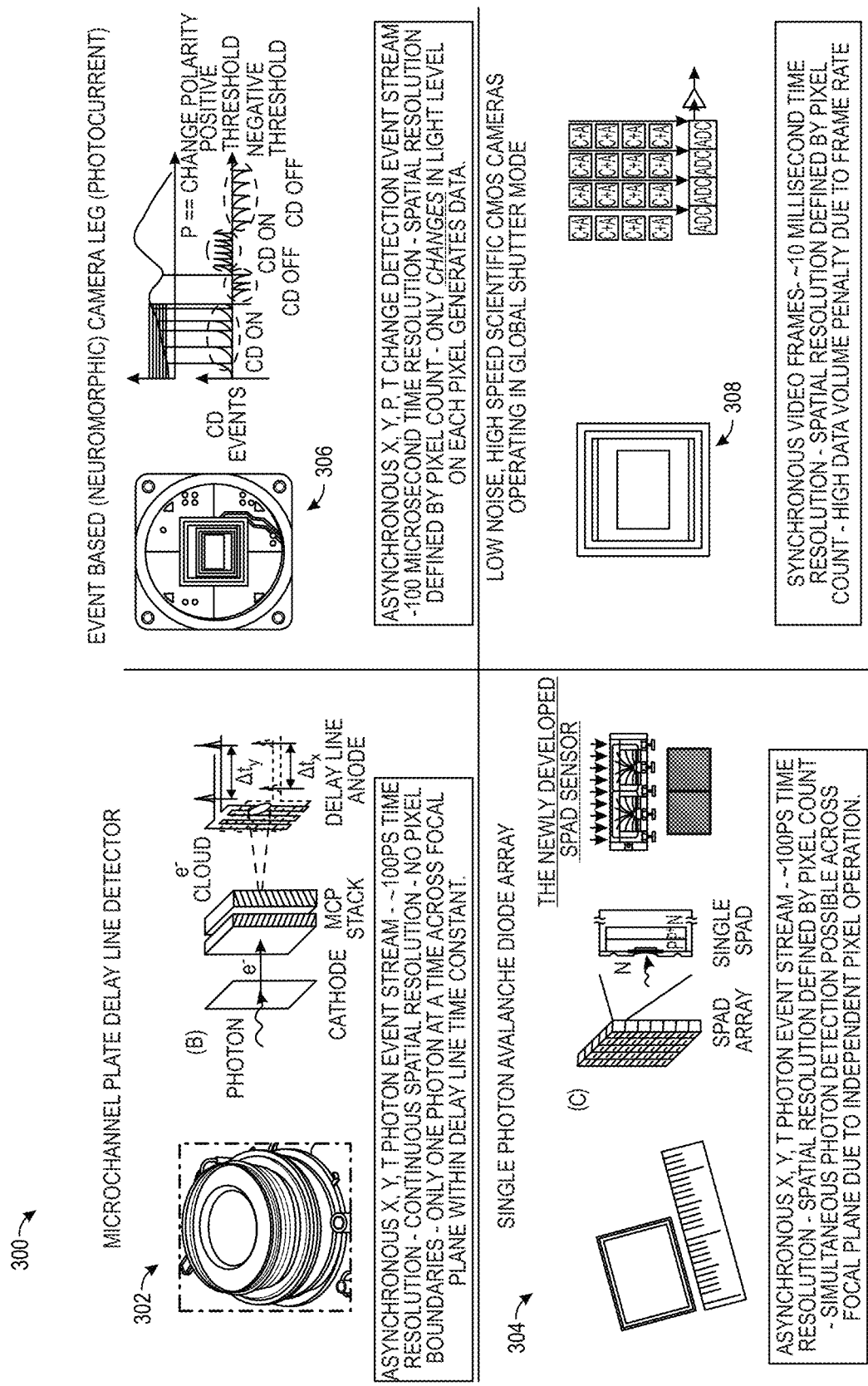
FIG. 3 depicts exemplary sensors for measuring angular velocity and angular acceleration.

FIG. 3 depicts an exemplary collection of sensors 300 that may be used in embodiments described herein. Ideally, a sensor that detects time of arrival and spatial location on the focal plane as well as the wavelength and/or polarization for each light event would provide information for greatly increasing the accuracy and reliability for measurements such that quick and accurate IOD would be possible. Currently, there is a tradeoff between measuring spatially and temporally for framing sensors. When high speed imaging is used, the location of the object includes error because a relatively low number of photons indicative of the location of the object are received. Similarly, in order to obtain more information on the location of the object, the exposure time must be increased. The methods and systems described herein may decouple the time and the space components using the sensor systems along with the methods for capture described herein.

Generally, coordinates X and Y described herein are coordinates on the focal plane of the various sensors. Furthermore, time (T) is used in association with the X and Y coordinates to generally describe the X and Y location of a light event, or event, at time T, wherein the light event comprises pixel illumination or a photon impact detection from a space object. Furthermore, "light" may be electromagnetic radiation of any wavelength. The techniques and detectors described herein work for light reflected from a space object, or emitted by a space object, either from artificial or natural light sources. Depending on the detectors, a single photon or light change event-based camera detector as described herein, could be used from the Extreme Ultraviolet (or even x-rays) to the long wave infrared. As such, a light wavelength band from 100 angstroms to 10 microns or broader could be detected. For example, the techniques described herein can work for ultraviolet light from the sun reflected off any space object, ultraviolet light emitted from thrusters on the space object, an artificial light (LED etc) on the space object, natural visible light from the sun reflected off the space object, lasers illuminating the space object, infrared radiation emitted by the heat of the space object, and/or the like.

In some embodiments, image photon counters (IPC) may be used. Exemplary microchannel plate (MCP) 302 delay line detector may be used. MCP 302 delay line detector may asynchronously detect photon position in X and Y and store a corresponding time T associated with each photon impact event while maintaining continuous spatial resolution. Similarly, single photon avalanche diode array (SPAD) 304 may asynchronously detect individual photons in X and Y, and accurately measure a corresponding time of impact. SPAD 304 may be limited in spatial resolution by pixel count; however, each pixel is independent. Independent operation of each pixel allows for simultaneous detection of photons across the focal plane. IPC sensors are discussed in more detail below.

In some embodiments, event-based sensor, which may be an event-based camera (EBC) 306, may be used. The exemplary EBC 306 illustrated is a neuromorphic camera. Asynchronous X, Y, P (polarity change), and time may be detected. Spatial resolution may be defined by pixel count. For event-based sensors described herein, light changes above a minimum threshold can be detected. This limits the data by only generating data when light illumination changes are detected rather than simultaneously collecting data from all pixels.

In some embodiments, a charged coupled device (CCD, not shown) or a complementary metal oxide semiconductor (CMOS) 308 may be used. CCD and CMOS 308 are framing cameras that present the tradeoff between spatial accuracy and timing accuracy described above. In some embodiments, a high frame rate in low light conditions must be used. Therefore, there can be a high data volume penalty.

The sensors shown in FIG. 3 are exemplary only. Any sensors that collect information indicative of position, angular velocity, and angular acceleration may be used. Furthermore, various sensors may be used in combination. The sensors described above are further described in embodiments below for detecting angular velocity and angular acceleration.

IPC and EBC 306 may allow angular rate and angular acceleration to be measured. Furthermore, the data gathered by these sensors can be transformed without distortion into any fixed or co-moving coordinate system. Therefore, any measurements can be used between any relatively fixed body or plurality of relatively fixed bodies and/or between a plurality of moving bodies.

Furthermore, frame sensor imaging, such as from charged couple devices (CCD), may collect photon data. However, the photon data may be subject to error down to +/- one electron in low-light conditions. Therefore, even in low light conditions it is impossible to reliably collect information on individual photons impacting the frames. This results in photons from the object being smeared out and diluted across the focal plane and mixed in with diffuse background light and starlight. The track on the CCD output provides only angular position and time data from a plurality of measurements.

Figure 4:
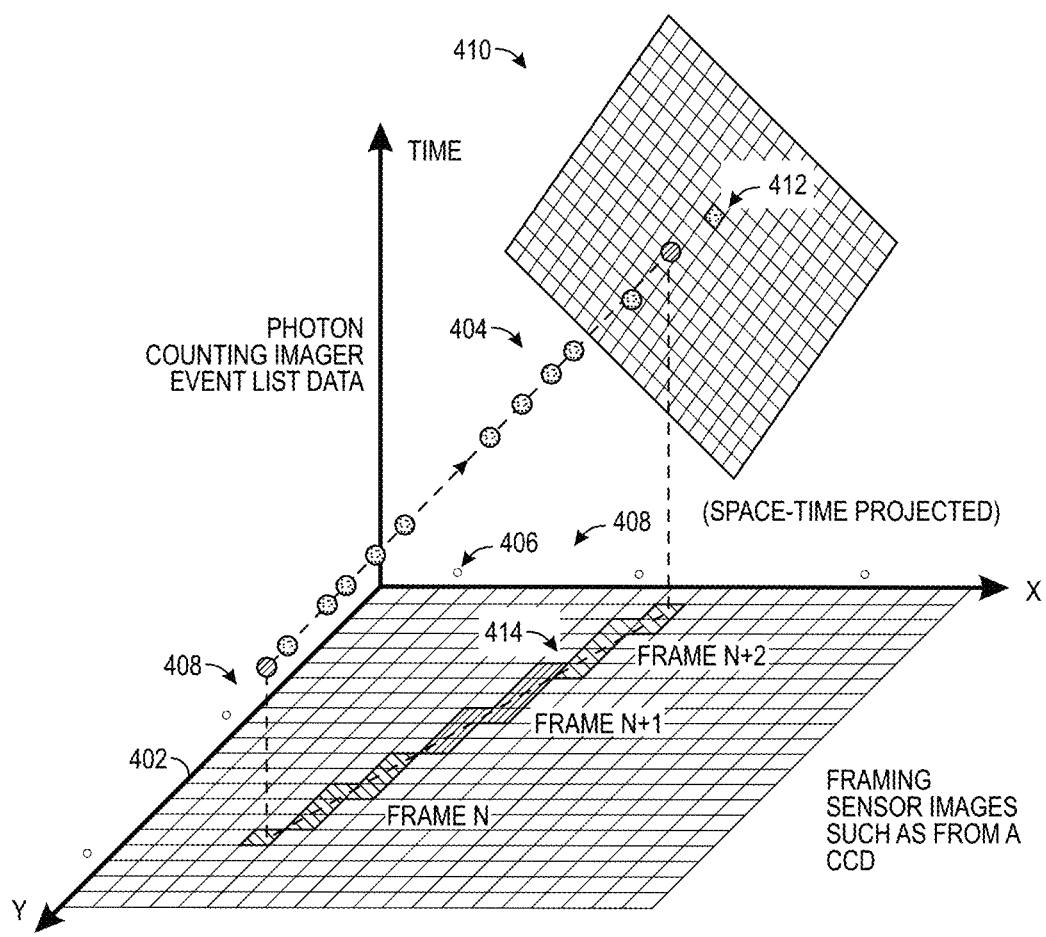
FIG. 4 depicts an embodiment of a photon counting imager vs framing sensor imaging.

FIG. 4 depicts an exemplary comparison between IPC (e.g., MCP 302 and SPAD 304) and framing sensors (e.g., CCD, CMOS 308). IPC may collect X, Y, and time information by taking vibration measurements on membrane 402. For example, photon 404 may impact the membrane causing a vibration or sound wave across membrane 402 to membrane sensors 406 located at edges 408 of membrane 402. Membrane sensors 406 may detect the vibration at different times. Knowing the propagation velocity of the vibration through membrane 402 gives the precise location and time that photon 404 impacted membrane 402. Therefore, the location and time data of the photon impact are known. Time tagged photon list data can be projected onto a plane 410 in a position-time three-dimensional space in which all the photon events from the space object track 414 fall into a single virtual pixel 412 as shown in FIG. 4. IPC allow rate tracking in software after the data is collected rather than during collection like the CCD. As shown, the observation is a continuous data collection. The observations for the IPC are each photon that impacts membrane 402. From the continuous data collection of the objects motion, higher order derivatives of the angular motion are derivable through the entire space object track 414. In the CCD, time delayed integration/orthogonal transfer arrays the tracking rate must be known during observation or mechanical rate tracking. With IPC, movies with arbitrary time resolutions may be created using the IPC data. This enhances moving object detection as variable motion rates may be applied such that the motion of objects (e.g., stars) in the sky may be obscured while the motion of the object to be detected is enhanced. Furthermore, through these same methods, a plurality of objects with different and arbitrary velocities may be detected in the same dataset.

Using the focal plane measurements (e.g., X and Y measurements) along with the precise time of the measurements, the angular velocity and the angular acceleration relative to the observer can be determined using the calculations presented in FIGS. 2A-2B. When the data is collected and the angular velocity and the angular acceleration are determined from the collected data, the angular velocity and the angular acceleration can be used to calculate the initial state vector using the above-described modified Laplace then input into the orbit determination algorithms (e.g., extended Kalman Filer (EKF), Gooding method). This provides a quick and efficient method of determining IOD when noise is present in the measurements.

Figure 5:
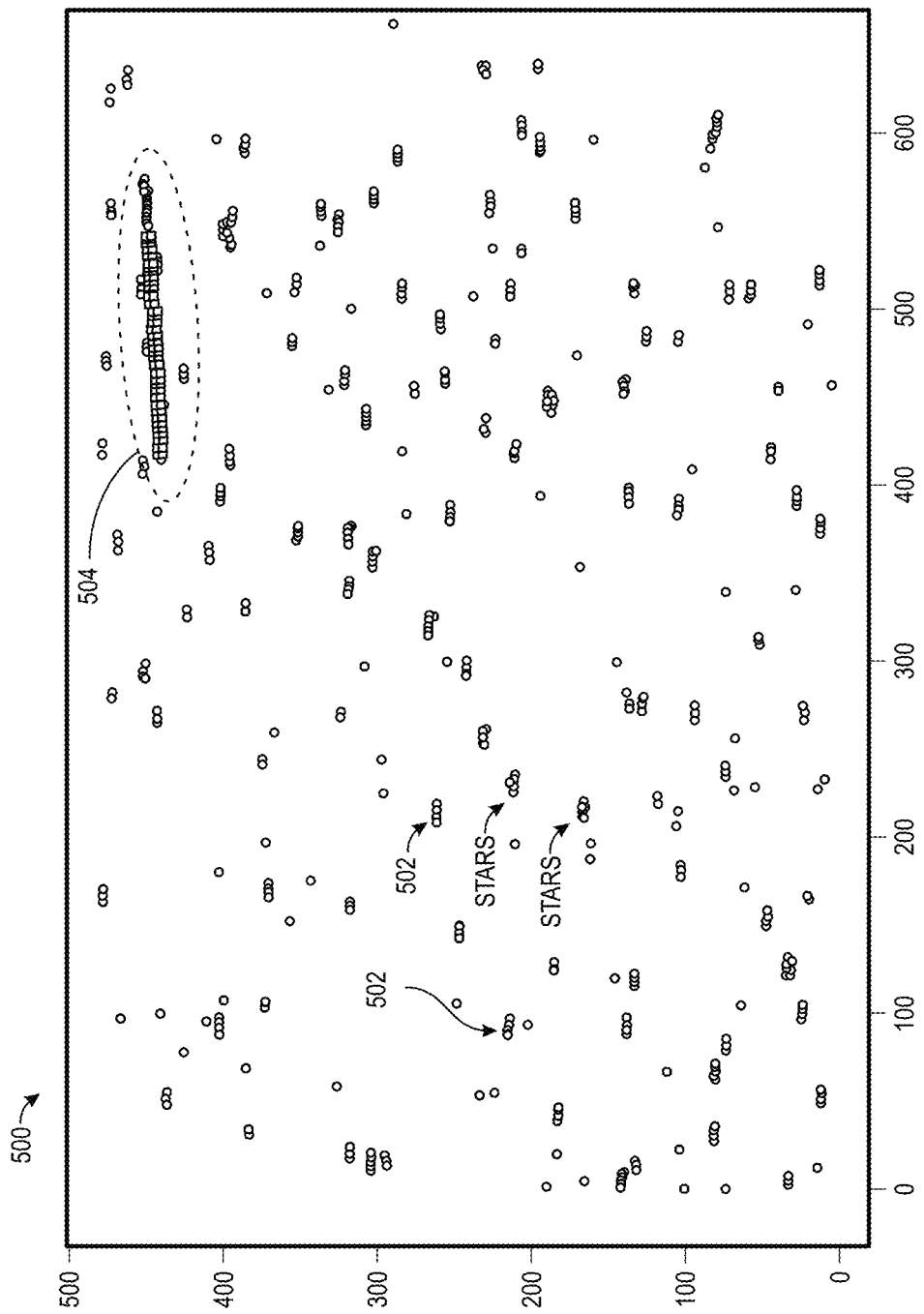
FIG. 5 depicts an exemplary satellite detection by an event-based sensing system.

Alternatively, in some embodiments, other sensors and techniques may be used to obtain the angular velocity and angular acceleration data of the object. FIG. 5 depicts an exemplary scatterplot 500 generated from data collected by EBC 306, for example. In some embodiments, EBC 306 may be used for detection of the objects. EBC 306 may record light level changes in pixels with high time resolution. EBC 306 may detect light changes above a threshold amount on each pixel and create a time stamp for each light change event. Accordingly, any change in the field of view is recorded along with a highly accurate time that the change occurred. As each pixel only records data when a change is detected, the amount of data and processing is reduced and compared to a frame-based camera where all frames record at the same time. This allows each pixel to operate independently of the other pixels.

Allowing EBC 306 to collect data of a portion of the sky provides data that may be visualized in exemplary scatterplot 500 in FIG. 5. The changes in pixels are clearly shown as the various stars 502 are visible as small lines caused by rotation of the earth and satellite 504 is a different length line caused by the satellites orbit. These lines are generated by the continuous detection light changes on each individual pixel and associated time data. Therefore, the object angular rate and angular acceleration may be directly determined from EBC 306 obtained data.

Figure 6:
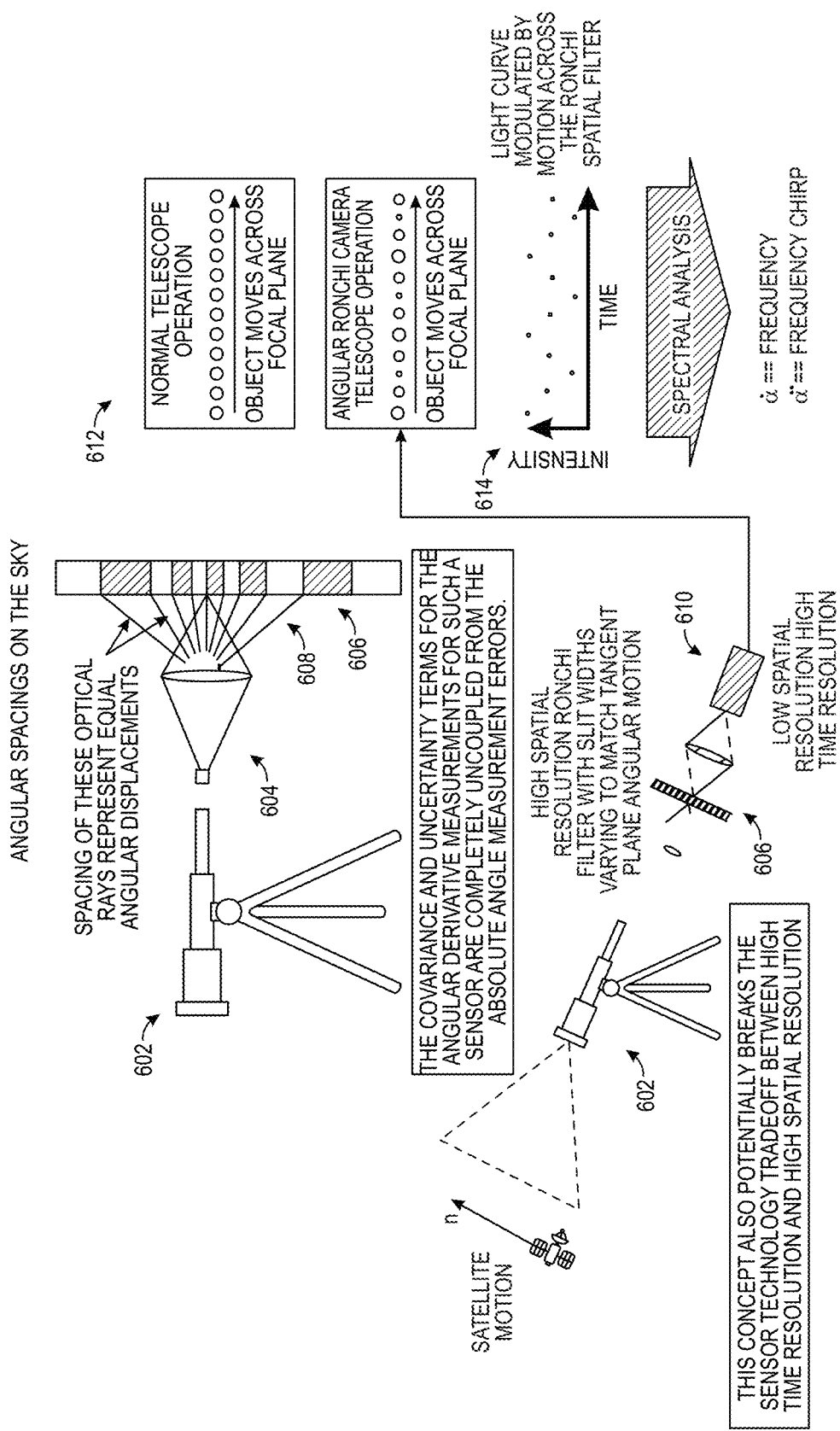
FIG. 6 depicts an embodiment of a system comprising a telescope and a Ronchi filter for measuring angular velocity and angular acceleration.

FIG. 6 depicts an embodiment of detecting intensity variations of the object as the object moves through the orbit. In the arrangement shown, the light from the object is magnified by telescope 602 then transmitted through a system of lenses 604 and Ronchi filter 606. Ronchi filter 606 may comprise varying slit widths to match the tangent plane angular motion. As such, as the object moves across the focal plane, the light intensity from the object passing through Ronchi filter 606 is indicative of the angular velocity of the object.

Ronchi filter 606 must have a variable slit pattern to match the angular displacements of the optical rays 608. Because of the tangent plane projection of the image on the focal plane, the spacing and width of Ronchi filter 606 bars should increase toward the edge of the field of view. This provides a openings of Ronchi filter 606 representing a constant angular displacement. Therefore, the angular velocity is directly measured without compensation for the ray displacement angles and is completely decoupled from the fixed angle measurements.

As the object moves across the focal plane, a low spatial resolution high time resolution sensor 610 may be used to accurately detect the time of the light event arrival and the light intensity of the light and dark bars as they change on the screen as shown at process 612. The frequency of change in the intensity 614 may be measured by spectral analysis. The intensity frequency may be indicative of the angular velocity and the change in intensity may be indicative of the angular acceleration. As such, the angular velocity and the angular acceleration may be determined by the spectral analysis. The angular velocity and the angular acceleration uncertainty and covariance are decoupled from the absolute angle measurements.

Figure 7:
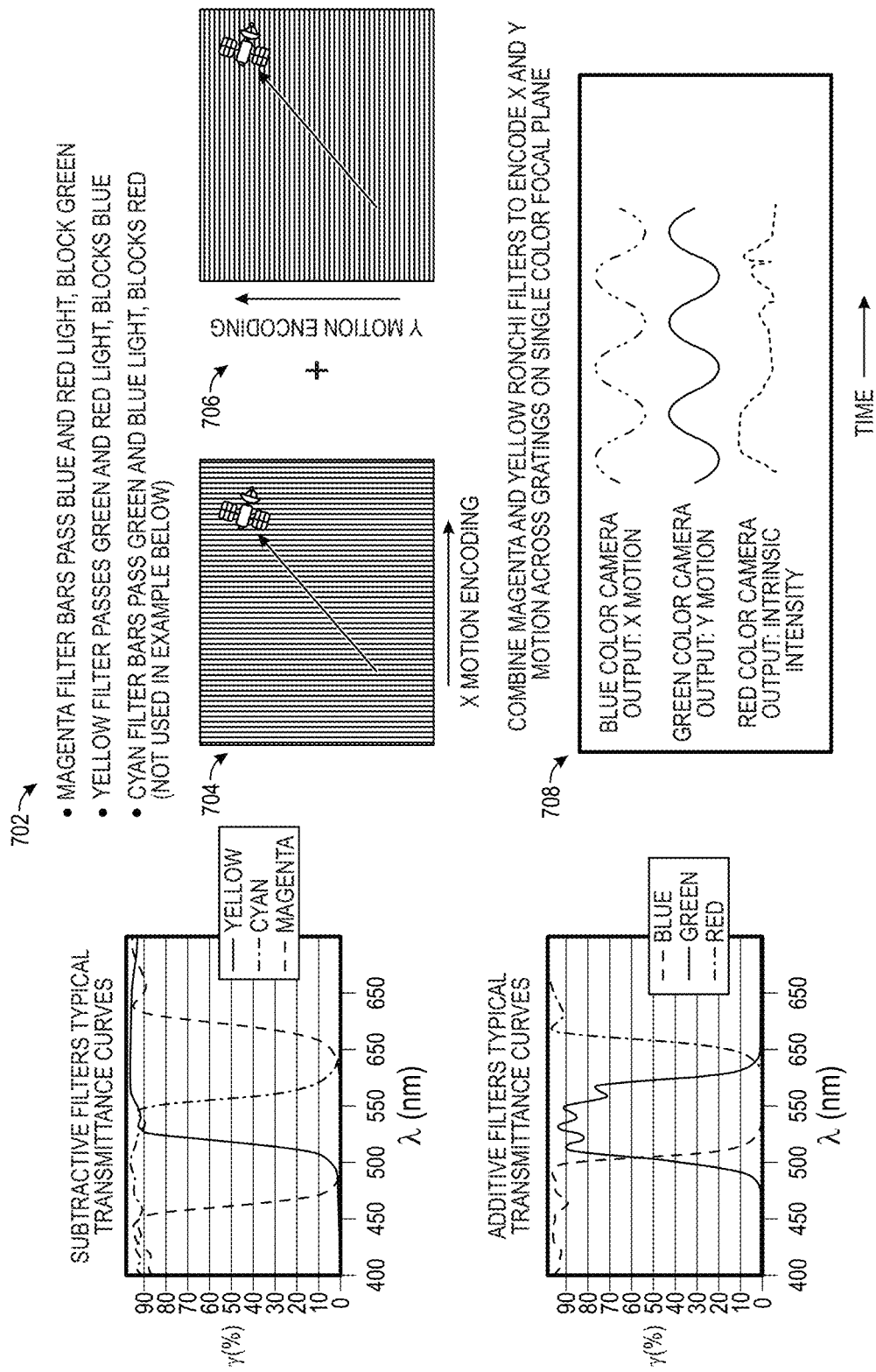
FIG. 7 depicts an embodiment of utilizing a color sensor and filters for independent measurements of two-dimensional motion and brightness.

FIG. 7 depicts an embodiment utilizing color filters to encode x and y motion and brightness. In some embodiments, three filters 702 may be used to block frequencies of light such that the motion encoding for each X and Y component is shown. In an exemplary embodiment, magenta filter 704 blocks green light allowing red and blue, yellow filter 706 blocks blue light allowing green and red, and a cyan filter (not shown) blocks red light passing green and blue. In some embodiments, the combination of the magenta and yellow Ronchi filters encodes X and Y motion across gratings on a single-color focal plane. A blue-green-red camera may be used to detect the different color outputs. At block 708, blue represents the component of X motion, green represents the component of Y motion, and red represents the intensity changes over time. This allows the angular motion to brightness intensity encoding to be performed with one telescope instead of three.

In some embodiments, additional algorithms (e.g., machine learning algorithms) may be applied to improve object detection and fidelity of results. For example, a convolution neural network (CNN) may be trained to characterize orbiting objects against the sky. Based on the time of exposure and the length of track, the type of orbit and possibly the type of satellite may be characterized by the CNN. Any artificial intelligence (AI) algorithm or statistical algorithm may be used to further enhance object detection.

Figure 8:
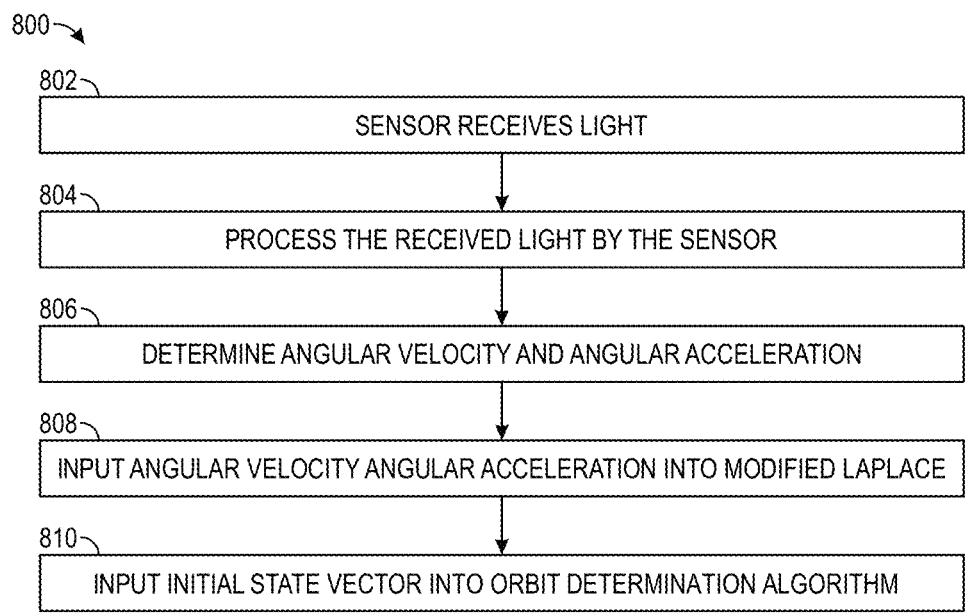
FIG. 8 depicts an exemplary process of IOD.

FIG. 8 depicts an exemplary method of determining an initial orbit, generally referenced by the numeral 800. At step 802, the sensor receives light from the sky including the orbiting object as described in embodiments above. The sensor may be any IPC, EBC, telescope sensor arrangement as describe above, and/or any other arrangement and combination that may be capable of detecting angular velocity and angular acceleration.

At step 804, the sensor processes the received light as described in embodiments above. Depending on the sensor that is being used the processing may be different. Here, the sensors may detect light events including frequency variations, intensity variations, illumination changes, and individual photons coupled with accurate time measurements to accurately determine angular position, angular velocity and angular acceleration of the detected orbital objects.

At step 806, the angular velocity and the angular acceleration may be determined from the received data. The received data collected by the sensors may be indicative of the angular velocity and the angular acceleration, but the data may be time and position data of photons, frequency change rates, intensity change rates, and the like as described above. A curve may be fit to the data indicative of the angular velocity and the angular acceleration. The angular velocity and angular acceleration may be determined from the curve fit. In some embodiments, the right ascension and the declination may be determined.

At step 808, the angular velocity and the angular acceleration may be input into the above-described algorithms (e.g., modified Laplace) to determine range and range rate between the target object and the observer. Furthermore, the initial state vector may be determined using the range and the range rate. The IOD is more quickly determined over current methods by inputting the angular velocity and the angular acceleration into the range and range rate equations described in FIGS. 2A and 2B. The initial state vector may then be used in the EKF or Batch algorithm at step 810. When noise is present in the real-world measurements, the above-described decoupled systems produce a convergence on the accurate orbit by a magnitude of at least one over current methods.

Figure 9:
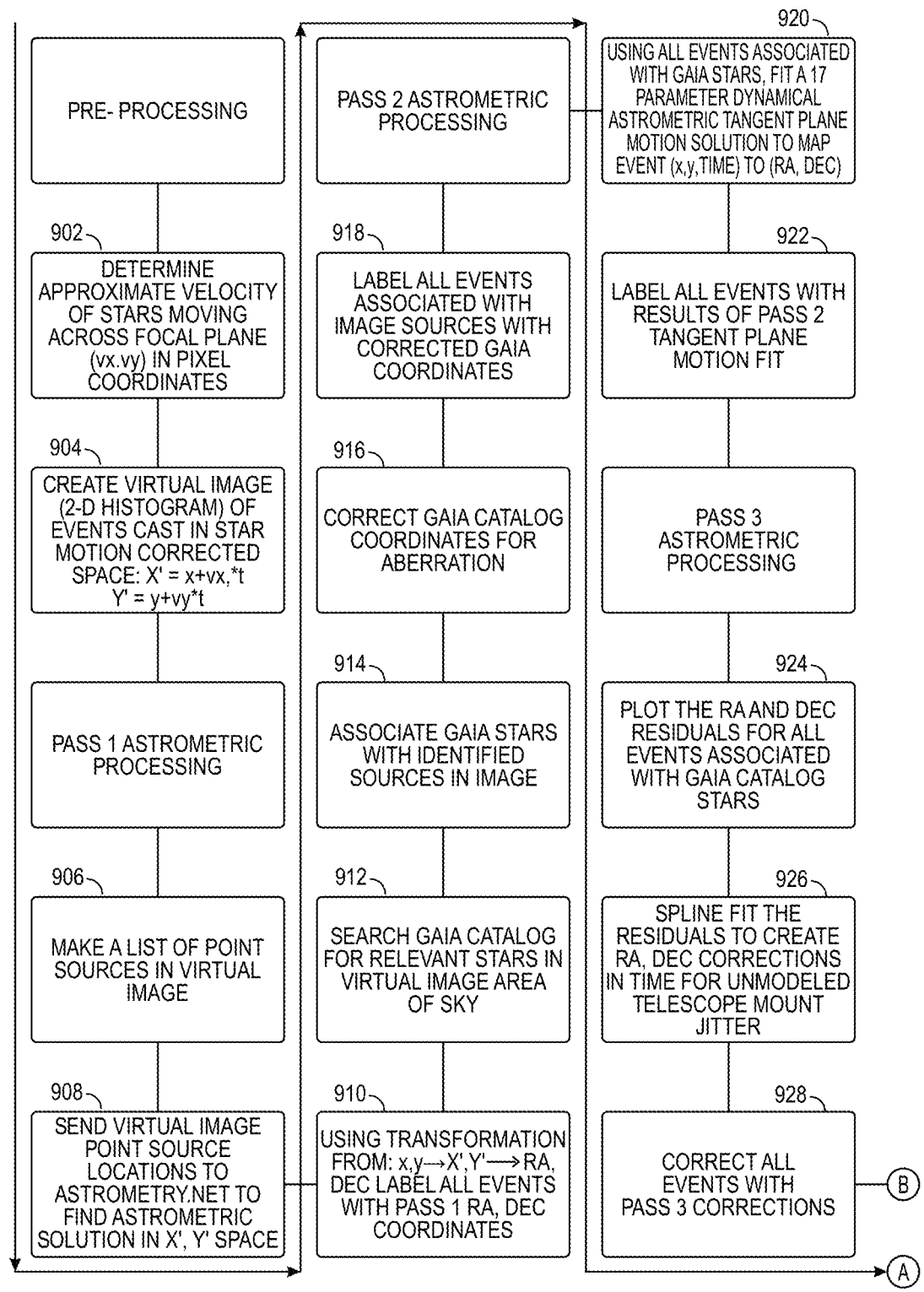
FIG. 9 depicts an exemplary process of calibration of a sensor for IOD.
Figure 9:
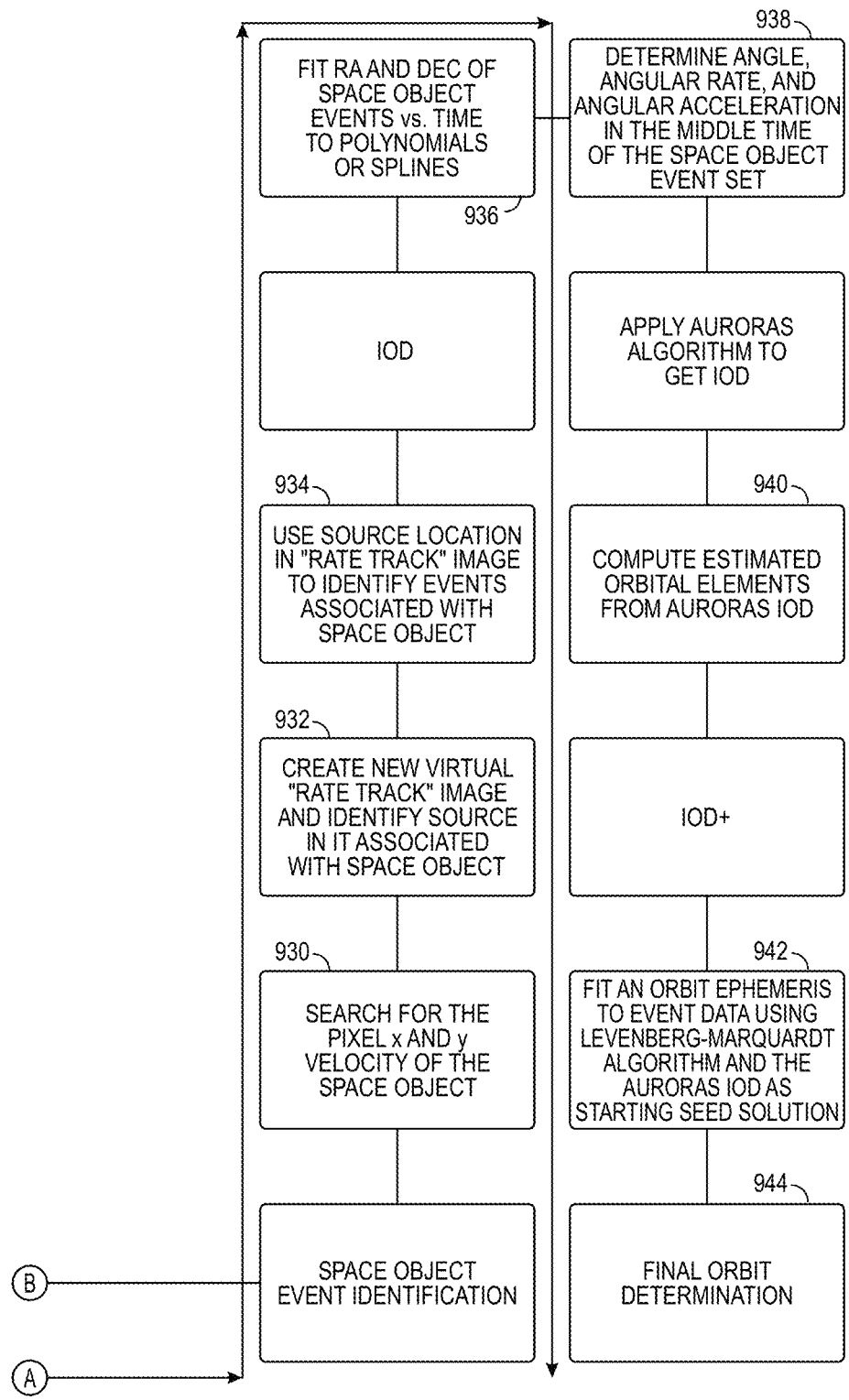

FIG. 9 depicts a more complete process of utilizing the sensors and algorithms for calibrating sensors, employing the IOD process described above, and using the IOD output for orbit determination. In some embodiments, exquisite calibration may be necessary or useful in providing an efficient IOD. In the calibration process may comprise a list-based process for generating a dynamic model of the sensor field of view. In some embodiments, the data may be conditioned for calculation in a pre-processing phase. In some embodiments, the sensor data may not be correct for calculation of astronomical coordinates. For example, the X and Y data on the focal plane, angular rate, angular acceleration, and so forth, may be scaled based on the sensor or telescopic parameters. A rescaling of the data may be used to generate a pseudo-X', Y' to produce a round and centered focal plane image. The data may be conditioned and divided up into one second time sections and saved as a flexible image transport system (FITS) image. The plurality of images may then be analyzed, solving for the astrometric coordinate system. In some embodiments, this process may be performed by a third party such as, for example, astronomy.net. The process is described in detail below.

Step 902 may begin the pre-processing routine to gather star data and create a corrected star data space. At step 902, the stars across the sky may be detected and the velocity moving across focal plane vx, vy, as described above, may be determined in pixel coordinates. In some embodiments, a best instrument arrangement for capturing the object may be determined. The best setting may be sensor specific. For example, the best setting may be a telescope orientation that is fixed. Accordingly, the sky will affectively move past the field of view of the telescope and the sensor. As such, the stars will trace a path across the field of view as will the objects in orbit. In some embodiments, it may be better to have the telescope move or rotate with the stars, so the stars are apparently motionless in the field of view and the only perceived movement are the orbiting objects. Furthermore, the telescope and sensors are arranged to detect the desired portion of the sky comprising the orbiting objects with known locations that may be compared later. For the exemplary process described herein, the telescope is stationary and corrections are made for the relative motion of the space objects.

A set of data may be received by the sensor. The sensor may be operated to receive the light from the sky to detect all luminous objects in the desired locations. The light is collected by the sensor. The sensor may be any of the above-described sensors and the light may be collected by any of the above-described systems and methods associated with the sensors.

At step 904, a virtual image (2-D histogram) of events may be cast in the star motion corrected space for sidereal tracking including the rotation of the earth and aberrations due to the relative velocity of earth. The star motion corrected space may be defined by $X'=x+vx*t$; $Y'=y+vy*t$.

At step 906, astrometric processing pass one begins. At step 906, point sources are selected in the virtual image and tabulated for identification and classification. The list-based approach described herein provides tracking data such that the data is not bent. The tracking data is added to the list as it becomes more and more refined as described in more detail below.

At step 908, the point source solutions are realized. The list of point source data may be submitted to an online database such as for example, astronomy.net, for processing. The astrometric solutions are provided in X', Y' space.

At step 910, all events may be transformed into to RA and DEC data coordinates using the solutions in X', Y' space. All events are then labeled with the RA and DEC data.

At step 912, a search in the GAIA catalogue may be conducted for relevant stars in the virtual image area of the sky. At step 914, GAIA stars are assigned to the source objects in the virtual image. At step 916, the GAIA catalogue coordinates are corrected for aberration data based on the Earth's velocity. At step 918, all events associate with the image sources are labeled with the corrected GAIA coordinates.

Astrometric processing pass two begins at step 920. At step 920, a seventeen-parameter time dependent dynamic model of the astrometric tangent plane is then fit to map each event x, y, time to RA and DEC. The mapping provides an x, y, and time stamp to each event and a transformation to RA and DEC. Furthermore, an optical barrel correction may be performed to correct for spherical mapping. A simultaneous fit is performed for space objects. This process defines how the field of view is moving across the sky relative to the sensor mount rotating with the Earth. The pixels coordinates may be fixed to right ascension and time. The list process continues adding more and more refined data to the list rather than bending the data to fit the mapping. This dynamic model fit is used to confirm the data and label the data as pass two RA and DEC position on the sky. This allows for quick transformation between X, Y, and time and RA, DEC, and time. At step 922, all events are labeled with the results of the pass 2 tangent plane motion fit.

Pass three astrometric processing begins at step 924. At step 924, the RA and DEC residuals for all events may be associated with the GAIA catalog stars may be plotted. At step 926, a spline fit may be generated for the for RA and DEC corrections in time. This may be used to correct the data for unmodeled inputs such as, for example, telescope mount jitter. At step 928, all events may be corrected with pass three corrections. These corrections provide real event location data indicative of the locations on the sky. At this point all events can be labeled as stars or the object (e.g., satellite, meteor, missile, or the like).

At step 930, space object event identification as described in embodiments above may begin. At step 930, the x and y pixel velocity of the object may be determined from the sensor data. Once the x and y pixel velocity are identified, the virtual rate track image may be generated at step 932 identifying the source. The virtual rate track image may be indicative of the x and y velocity of the source over time and the events associated with the source may be tracked over time at step 934. The source of the light impacts may be compared to identify the object based on the rate track as described in embodiments above.

The above-described IOD process may begin at step 936. At step 936, RA and DEC of space objects may be fit to polynomials and splines. The middle time of the space object event set may be determined and the angle, angular rate, and angular acceleration at that time may be determined at step 938.

The IOD algorithm may be applied at step 940. At step 940, the range and range rate may be computed using the measured angular velocity and angular acceleration. Furthermore, the other orbital elements may be computed from the IOD. In some embodiments, the other orbital elements may be the orbital elements necessary to describe the orbit as shown in FIGS. 2A and 2B and described in detail above.

At step 942 an extension to the IOD may be added, referenced herein as IOD$_+$. At step 942, an exemplary Levenberg-Marquardt algorithm may be used in conjunction with the IOD to fit an orbit ephemeris to the event data. The orbit ephemeris may be used as a starting seed solution for orbit determination. This provides a better starting seed at a quicker time than current standard methods of orbit determination.

At step 944, typical orbit determination techniques may be used to estimate an orbit of the space object using the starting seed solution.

Figure 10:
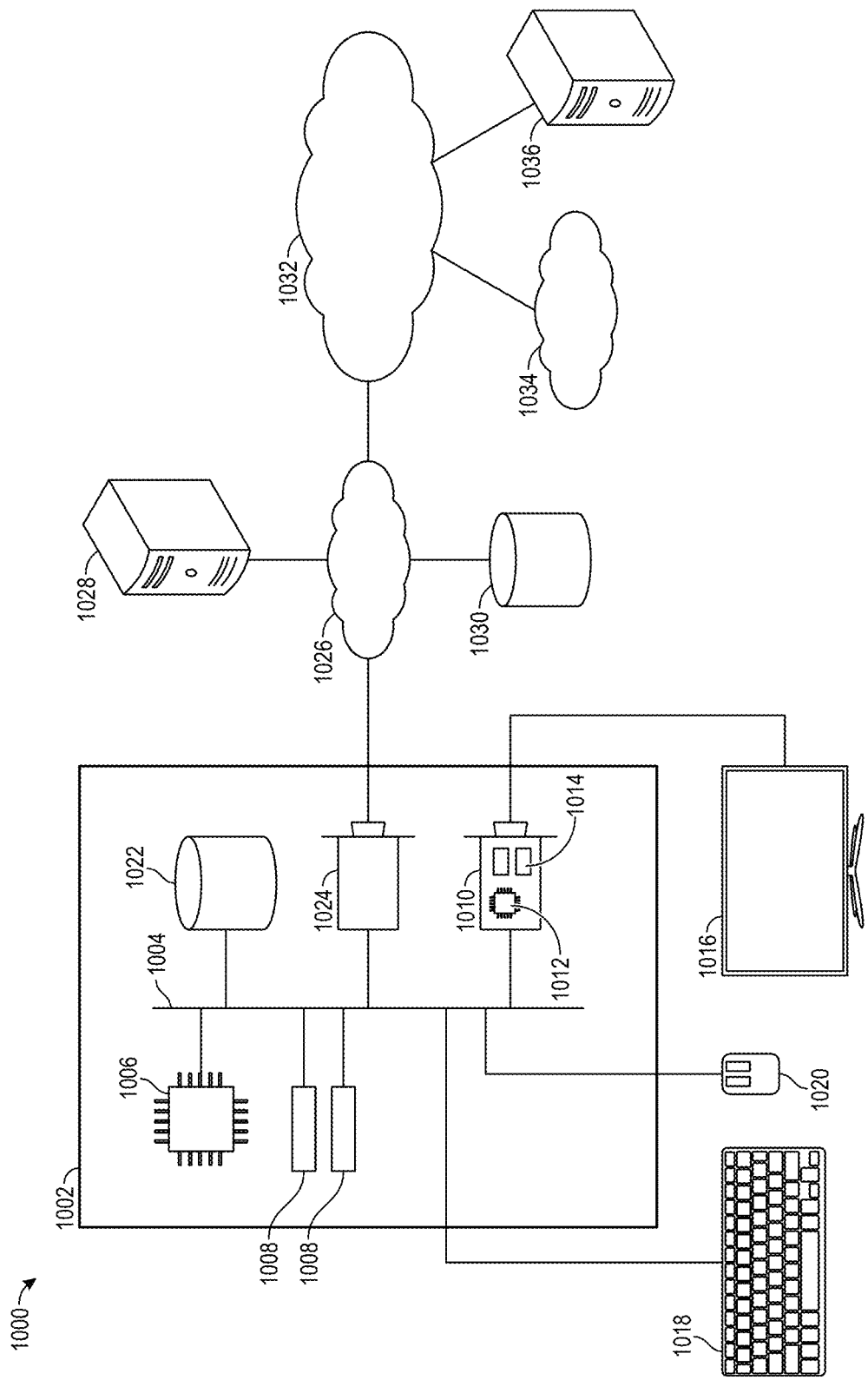
FIG. 10 depicts a hardware system for embodiments of the disclosure.

In FIG. 10, an exemplary hardware platform 1000 for certain embodiments of the invention is depicted. Computer 1002 can be a desktop computer, a laptop computer, a server computer, a mobile device such as a smartphone or tablet, or any other form factor of general- or special-purpose computing device. Depicted with computer 1002 are several components, for illustrative purposes. In some embodiments, certain components may be arranged differently or absent. Additional components may also be present. Included in computer 1002 is system bus 1004, whereby other components of computer 1002 can communicate with each other. In certain embodiments, there may be multiple busses or components may communicate with each other directly. Connected to system bus 1004 is central processing unit (CPU) 1006. Also attached to system bus 1004 are one or more random-access memory (RAM) modules 1008. Also attached to system bus 1004 is graphics card 1010. In some embodiments, graphics card 1010 may not be a physically separate card, but rather may be integrated into the motherboard or the CPU 1006. In some embodiments, graphics card 1010 has a separate graphics-processing unit (GPU)

1012, which can be used for graphics processing or for general purpose computing (GPGPU). Also on graphics card 1010 is GPU memory 1014. Connected (directly or indirectly) to graphics card 1010 is display 1016 for user interaction. In some embodiments, no display is present, while in others it is integrated into computer 1002. Similarly, peripherals such as keyboard 1018 and mouse 1020 are connected to system bus 1004. Like display 1016, these peripherals may be integrated into computer 1002 or absent. Also connected to system bus 1004 is local storage 1022, which may be any form of computer-readable media and may be internally installed in computer 1002 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire. Examples of stored information include computer-usable instructions, data structures, program modules, and other data representations.

Finally, network interface card (NIC) 1024 is also attached to system bus 1004 and allows computer 1002 to communicate over a network such as network 1026. NIC 1024 can be any form of network interface known in the art, such as Ethernet, ATM, fiber, Bluetooth, or Wi-Fi (i.e., the IEEE 802.11 family of standards). NIC 1024 connects computer 1002 to local network 1026, which may also include one or more other computers, such as computer 1028, and network storage, such as data store 1030. Generally, a data store such as data store 1030 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 1028, accessible on a local network such as local network 1026, or remotely accessible over Internet 1032. Local network 1026 is in turn connected to Internet 1032, which connects many networks such as local network 1026, remote network 1034 or directly attached computers such as computer 1036. In some embodiments, computer 1002 can itself be directly connected to Internet 1032.

In some aspects, the techniques described herein relate to a method of determining an orbit of an object, the method including: obtaining, by a sensor, data indicative of a plurality of objects in orbits, wherein the data is indicative of angular velocity and angular acceleration of the object of the plurality of objects, identifying the object from the data, measuring the angular velocity and the angular acceleration from the data, determining an initial orbit of the object using the angular velocity and the angular acceleration, and estimating orbital elements from the initial orbit of the object.

In some aspects, the method further includes detecting locations of light impacts on pixels of the sensor, wherein the locations of the light impacts are indicative of relative locations of the plurality of objects in a field of view; generating a virtual rate track image of the locations of the light impacts over time; and identifying the object and an associated angle, the angular velocity, and the angular acceleration from the virtual rate track image.

In some aspects, the techniques described herein relate to the method, wherein the sensor is an event-based camera, and wherein the data is indicative of a change in luminosity on each pixel of the event-based camera.

In some aspects, the techniques described herein relate to the method, wherein the sensor is an image photon counter, and the data is indicative of a time and a location of photon impacts on the sensor.

In some aspects, the techniques described herein relate to the method, wherein the sensor is a color sensor and incoming light is filtered to be indicative of components of the angular velocity and the angular acceleration.

In some aspects, the techniques described herein relate to the method, wherein the sensor is an earth-based sensor or a space-based sensor.

In some aspects, the techniques described herein relate to one or more non-transitory computer-readable media storing computer-executable instructions that, when executed by at least one processor, performs a method of determining an orbit of an object. The method including obtaining, by a sensor, data indicative of a plurality of objects in orbits, wherein the data is indicative of angular velocity and angular acceleration of the object of the plurality of objects, identifying the object from the data by: generating a virtual rate track image including virtual rate tracks of each object of the plurality of objects in the virtual rate track image, mapping the virtual rate tracks to locations in a field of view, identifying the plurality of objects based on the locations in the field of view, and identifying the object from the plurality of objects based on a comparison of the virtual rate tracks; and determining the angular velocity and the angular acceleration of the object from the virtual rate tracks, determining an initial orbit of the object using the angular velocity and the angular acceleration, and estimating orbital elements from the initial orbit of the object.

In some aspects, the techniques described herein relate to the media, wherein the method further includes determining an initial state vector including range and range rate of the object determined from the angular velocity and the angular acceleration.

In some aspects, the techniques described herein relate to the media, further including: determining the initial orbit of the object by fitting an orbit ephemeris to the data; and determining the orbit of the object using the initial orbit as a starting seed solution.

In some aspects, the techniques described herein relate to the media, wherein the orbit ephemeris is fitted to the data using a Levenberg-Marquardt algorithm.

In some aspects, the techniques described herein relate to the media, wherein the sensor is one of a microchannel plate delay line detector, event-based camera, single photon avalanche diode array, or a complementary metal oxide semiconductor.

In some aspects, the techniques described herein relate to the media, wherein the angular velocity, the angular acceleration, and an associated angle are determined at a middle time of the data.

In some aspects, the techniques described herein relate to the media, wherein the sensor is a positioned in space.

In some aspects, the techniques described herein relate to one or more non-transitory computer-readable media storing computer-executable instructions that, when executed by at least one processor, performs a method of determining an orbit of an object. The method includes obtaining, by a sensor, data indicative of a plurality of objects in orbits, wherein the data is indicative of angular velocity and angular acceleration of the object of the plurality of objects, identifying the object from the data; measuring the angular velocity and the angular acceleration from the data, determining an initial orbit of the object by fitting an orbit ephemeris to the data; and determining the orbit of the object using the initial orbit as a starting seed solution for an orbit determination algorithm.

In some aspects, the techniques described herein relate to the media, wherein the sensor is one of a microchannel plate delay line detector, event-based camera, single photon avalanche diode array, or a complementary metal oxide semiconductor.

In some aspects, the techniques described herein relate to the media, wherein the method further includes determining an x and y pixel velocity of the object on the sensor.

In some aspects, the techniques described herein relate to the media, wherein the identifying the object from the data includes: generating a virtual rate track image from the x and y pixel velocity, the virtual rate track image including virtual rate tracks of each object of the plurality of objects in the virtual rate track image, mapping the virtual rate tracks to locations in a field of view; and comparing each rate track of the virtual rate tracks to determine a rate track corresponding to the object.

In some aspects, the techniques described herein relate to the media, wherein the angular velocity, the angular acceleration, and an associated angle are determined at a middle time of the data.

In some aspects, the techniques described herein relate to the media, wherein the orbit ephemeris is fitted to the data using a Levenberg-Marquardt algorithm.

Although the invention has been described with reference to the embodiments illustrated in the attached drawing figures, it is noted that equivalents may be employed, and substitutions made herein without departing from the scope of the invention as recited in the claims.

Having thus described various embodiments of the disclosure, what is claimed as new and desired to be protected by Letters Patent includes the following:

1. A system for determining an orbit of an object, the system comprising:
   a sensor configured to obtain light event data indicative of objects in orbits;
   a data store;
   at least one processor; and
   one or more non-transitory computer-readable media storing computer-executable instructions that, when executed by the at least one processor, perform a method of determining the orbit of the object, the method comprising:
      detecting light events by the sensor,
      wherein the light events are indicative of the objects and locations of the objects in a field of view of the sensor;
      generating sensor data indicative of the light events detected by the sensor over time;
      storing, in the data store, tracking data indicative of the objects and the locations of the objects over time based on the sensor data;
      identifying the object from the tracking data;
      determining angular velocity and angular acceleration of the object from the tracking data; and
      determining an initial orbit of the object using the angular velocity and the angular acceleration.

2. The system of claim 1, wherein the identifying the object comprises:
   generating a virtual rate track image from the tracking data,
   wherein the virtual rate track image comprises data indicative of velocities of the objects across a plane associated with the field of view; and
   identifying the object from the objects based on a comparison of each of the velocities of the objects across the plane.

3. The system of claim 1,
   determining the initial orbit of the object by fitting an orbit ephemeris to the tracking data; and
   determining the orbit of the object using the initial orbit as a starting seed solution for an orbit determination algorithm.

4. The system of claim 1, wherein the sensor is one of a microchannel plate delay line detector, event-based camera, single photon avalanche diode array, or a complementary metal oxide semiconductor.

5. The system of claim 1, wherein the sensor is positioned on a satellite.

6. The system of claim 5, wherein the satellite is in an Earth-based orbit.

7. The system of claim 1, wherein the method further comprises determining an initial state vector comprising range and range rate of the object determined from the angular velocity and the angular acceleration.

8. One or more non-transitory computer-readable media storing computer-executable instructions that, when executed by at least one processor, perform a method of determining an orbit of an object, the method comprising:
   generating sensor data indicative of light events obtained by an event-based sensor,
   wherein the light events are indicative of objects and locations of the objects in a field of view of the event-based sensor;
   storing, in a data store, tracking data indicative of the objects and the locations of the objects over time;
   identifying the object from the tracking data;
   determining angular velocity and angular acceleration of the object from the tracking data; and
   determining an initial orbit of the object using the angular velocity and the angular acceleration.

9. The media of claim 8, wherein the identifying the object comprises:
   generating a virtual rate track image from the tracking data,
   wherein the virtual rate track image comprises data indicative of velocities of the objects across a plane associated with the field of view; and
   identifying the object from the objects based on a comparison of each of the velocities of the objects across the plane.

10. The media of claim 8,
    determining the initial orbit of the object by fitting an orbit ephemeris to the tracking data; and determining the orbit of the object using the initial orbit as a starting seed solution for an orbit determination algorithm.

11. The media of claim 8, wherein the sensor data is indicative of one of a microchannel plate delay line detector, event-based camera, single photon avalanche diode array, or a complementary metal oxide semiconductor.

12. The media of claim 8, wherein the method further comprises determining an initial state vector comprising range and range rate of the object determined from the angular velocity and the angular acceleration.

13. The media of claim 8, wherein the sensor data is generated based on the event-based sensor positioned on a satellite in orbit.

14. The media of claim 13, wherein the orbit is an Earth-based orbit.

15. A method of determining an orbit of an object, the method comprising:
- generating sensor data indicative of light events obtained by an event-based sensor,
- wherein the light events are indicative of objects and locations of the objects in a field of view of the event-based sensor;
- storing, in a data store, tracking data indicative of the objects and the locations of the objects over time;
- identifying the object from the tracking data;
- determining angular velocity and angular acceleration of the object from the tracking data; and
- determining an initial orbit of the object using the angular velocity and the angular acceleration.

16. The method of claim 15, wherein the identifying the object comprises:
- generating a virtual rate track image from the tracking data,
- wherein the virtual rate track image comprises data indicative of velocities of the objects across a plane associated with the field of view; and
- identifying the object from the objects based on a comparison of each of the velocities of the objects across the plane.

17. The method of claim 15,
- determining the initial orbit of the object by fitting an orbit ephemeris to the tracking data; and
- determining the orbit of the object using the initial orbit as a starting seed solution for an orbit determination algorithm.

18. The method of claim 15, wherein the sensor data is indicative of one of a microchannel plate delay line detector, event-based camera, single photon avalanche diode array, or a complementary metal oxide semiconductor.

19. The method of claim 15, wherein the sensor data is generated based on the event-based sensor positioned on a satellite in orbit.

20. The method of claim 19, wherein the orbit is based at least in part on a lunar orbit of the Moon around the Earth.

\* \* \* \* \*